(12) United States Patent
Alter et al.

(10) Patent No.: US 10,042,843 B2
(45) Date of Patent: Aug. 7, 2018

(54) METHOD AND SYSTEM FOR SEARCHING WORDS IN DOCUMENTS WRITTEN IN A SOURCE LANGUAGE AS TRANSCRIPT OF WORDS IN AN ORIGIN LANGUAGE

(71) Applicant: OPISOFT CARE LTD., Tel-Aviv (IL)

(72) Inventors: Alon Alter, Raanana (IL); Oksana Tozhovez, Petah Tikwa (IL)

(73) Assignee: OPISOFT CARE LTD., Tel-Aviv (IL)

( * ) Notice: Subject to any disclaimer, the term of this patent is extended or adjusted under 35 U.S.C. 154(b) by 0 days.

(21) Appl. No.: 15/317,767

(22) PCT Filed: Jun. 10, 2015

(86) PCT No.: PCT/IL2015/050584
§ 371 (c)(1),
(2) Date: Dec. 9, 2016

(87) PCT Pub. No.: WO2015/193879
PCT Pub. Date: Dec. 23, 2015

(65) Prior Publication Data
US 2017/0116175 A1    Apr. 27, 2017

(30) Foreign Application Priority Data
Jun. 15, 2014   (IL) .......................... 233143

(51) Int. Cl.
*G06F 17/27*   (2006.01)
*G06F 17/30*   (2006.01)
(Continued)

(52) U.S. Cl.
CPC ........ *G06F 17/277* (2013.01); *G06F 17/2223* (2013.01); *G06F 17/2755* (2013.01);
(Continued)

(58) Field of Classification Search
CPC ............. G06F 17/2863; G06F 17/2809; G06F 17/2755
See application file for complete search history.

(56) References Cited

U.S. PATENT DOCUMENTS

| 6,581,034 B1* | 6/2003 | Choi | ..................... G06F 17/273 704/10 |
| 2004/0054533 A1* | 3/2004 | Bellegarda | ............ G10L 15/063 704/254 |

(Continued)

OTHER PUBLICATIONS

Cohen, Raphael, Yoav Goldberg, and Michael Elhadad. "Transliterated Pairs Acquisition in Medical Hebrew.", Machine Translation and Morphologically-rich Languages Research Workshop of the Israel Science Foundation University of Haifa, Israel, Jan. 23-27, 2011.*

Cohen, Raphael, and Michael Elhadad. "Effect of Out of Vocabulary terms on inferring eligibility criteria for a retrospective study in Hebrew EHR." Acl. vol. 2013. 2013.*

(Continued)

*Primary Examiner* — Brian L Albertalli
(74) *Attorney, Agent, or Firm* — The Law Office of Michael E. Kondoudis (57) ABSTRACT

The invention relates to a method used by computers for searching words in documents written in a source language, which are not in the vocabulary of said source language, but are transcript of meaningful words in an origin language. The method is comprised of a preparation process and a search process. During the preparation process a database of unrecognized words in the source language is maintained, which contains, among other data, normalized phonetic conversion of the unrecognized word, as well as a corpus of all words of the documents in the search domain and indexes for efficient search. During search, a phonetic conversion and normalization is done for the search word, and the distance to similar phonetics words in the corpus is calculated. The found words in the corpus are arranged in ascending order, and the relevant documents are displayed.

4 Claims, 6 Drawing Sheets

(51) Int. Cl.
*G06F 17/28* (2006.01)
*G06F 17/22* (2006.01)

(52) U.S. Cl.
CPC ........ *G06F 17/28* (2013.01); *G06F 17/30011* (2013.01); *G06F 17/30613* (2013.01); *G06F 17/30681* (2013.01); *G06F 17/30696* (2013.01)

(56) References Cited

U.S. PATENT DOCUMENTS

| | | | | |
|---|---|---|---|---|
| 2007/0083369 | A1* | 4/2007 | McCuller | G10L 15/187 704/254 |
| 2008/0046405 | A1* | 2/2008 | Olds | G06F 17/3064 |
| 2008/0082505 | A1* | 4/2008 | Kokubu | G06F 17/30427 |
| 2010/0285435 | A1* | 11/2010 | Keim | G09B 19/04 434/157 |
| 2011/0040552 | A1* | 2/2011 | Van Guilder | G06F 17/246 704/4 |
| 2011/0275037 | A1* | 11/2011 | Alghamdi | G09B 19/08 434/157 |

OTHER PUBLICATIONS

Kirschenbaum, Amit, and Shuly Wintner. "A General Method for Creating a Bilingual Transliteration Dictionary." LREC. 2010.*

Itai, Alon, Shuly Wintner, and Shlomo Yona. "A computational lexicon of contemporary Hebrew." Proceedings of the fifth international conference on Language Resources and Evaluation (LREC-2006), Genoa, Italy. 2006.*

Deléger, Louise, Magnus Merkel, and Pierre Zweigenbaum. "Enriching medical terminologies: an approach based on aligned corpora." MIE. 2006.*

Divita, Guy, Graciela Rosemblat, and Allen C. Browne. "Building a Medical Spanish Lexicon." AMIA Annual Symposium proceedings/AMIA Symposium AMIA Symposium: 2007. vol. 941. 2007.*

Cohen, Raphael, Michael Elhadad, and Noémie Elhadad. "Redundancy in electronic health record corpora: analysis, impact on text mining performance and mitigation strategies." BMC bioinformatics 14.1 (2013): 10.*

Goldberg, Yoav, and Michael Elhadad. "Identification of transliterated foreign words in Hebrew script." Computational linguistics and intelligent text processing (2008): 466-477.*

Cohen, Raphael. Towards Understanding of Medical Hebrew. Diss. Ben-Gurion University of the Negev, 2012.*

* cited by examiner

FIG. 3 prefixes

אאורטה, וכשלאאורטה, ושלהאאורטה, כשמהאאורטה, האאורטה, וכשלהאאורטה, ושמאאורטה, לאאורטה, ואאורטה, וכשמאאורטה, ושמהאאורטה, להאאורטה, ובאאורטה, וכשמהאאורטה, כאאורטה, מאאורטה, ובהאאורטה, ולאאורטה, כהאאורטה, מהאאורטה, והאאורטה, ולהאאורטה, כשאאורטה, שאאורטה, וכאאורטה, ומאאורטה, כשבאאורטה, שבאאורטה, וכהאאורטה, ומהאאורטה, כשבהאאורטה, שבהאאורטה, וכשאאורטה, ושאאורטה, כשהאאורטה, שהאאורטה, וכשבאאורטה, ושבאאורטה, כשכאאורטה, שכאאורטה, וכשבהאאורטה, שבהאאורטה, כשכהאאורטה, שכהאאורטה, וכשהאאורטה, ושהאאורטה, כשלאאורטה, שלאאורטה, וכשכאאורטה ושכאאורטה, כשלהאאורטה, שלהאאורטה ושכהאאורטה, שמאאורטה, שמהאאורטה

FIG. 3A suffixes

| Distance | Word |
|---|---|
| 0 | צרביקלי' |
| 4 | הצרבקלית |
| 9 | קרני-צרבקלי' |
| 10 | קרניוצרביקלי' |
| 11 | קרניי-צרביקלי' |
| 12 | הקרניוצרבקלי' |
| 12 | קרניוצרויקלי' |
| 14 | קרניוצרוויקלי' |
| 14 | הקרניוצרויקלי' |
| 15 | קרניי-צרווקלי' |

FIG. 4A

METHOD AND SYSTEM FOR SEARCHING WORDS IN DOCUMENTS WRITTEN IN A SOURCE LANGUAGE AS TRANSCRIPT OF WORDS IN AN ORIGIN LANGUAGE

FIELD OF THE INVENTION

The invention generally relates to the field of search engines and more particularly to search engines in medical documents written in Hebrew containing Hebraization of the Latin medical terms.

BACKGROUND OF THE INVENTION

In Israel, doctors write their prognosis of the patient's health in Hebrew where medical terms are written either in Hebrew, in English—using English alphabet, or English terms spelled with Hebrew alphabet (Hebraization of the English (Latin) terms). Furthermore, hebraization of an English (Latin) term may result plurality of Hebrew letter combinations. This causes problems in conducting computerized searches in documents that contain similar medical terms.

There is no comprehensive Hebrew medical dictionary, ontology or lexicon that either contains or translates multiple hebraization combinations of an English (Latin) term into English (Latin). Standard Hebrew dictionaries do not contain the Hebraized word and thus it is considered to be meaningless Hebrew word.

An example will further clarify the problem. The term "Cervical", after hebraization may be written in multiple ways such as " צֶרְבִיקֵל", "צֶרְוַיקֵי", "צרניקלי ", " סֶרביקאֵלֵי", "סַרוַיקלֵי". (The different letters are underscored). It is instantly noted that each word is differently spelled, although all have the same meaning. The Hebrew term for "cervical" is " של צוואר הרחם ".

Search engines and dictionaries used today assume that each word has one and only one correct spelling.

Thus, a search for a medical term in the medical "mixed language documents" must yield all the various shapes of that medical term. Currently there are no systems that allow for a document search in a mixed language environment where multiple spellings of the same word are acceptable.

SUMMARY OF THE INVENTION

In countries that use relaxed-spelling ruled languages there is a need for a system that sifts through the masses of medical documents on file and allows for fast, efficient and accurate search.

The present invention allows just that; it effectively bypasses the relaxed-spelling rules of these languages—source language (e.g. Hebrew) by comparing the phonetic representations of the trans-literal words in origin language (e.g. Latin words written with non-Latin script). This allows the system, through vector calculations of the distance between different phonetics of the words, which in turn allows the system to compare different spellings of the word. A typical distance used is the edit distance as computed by Levenshtein's algorithm.

A more accurate description of this, the heart of this invention, is shown in the following description and the drawings.

There is one more key process that allows the present invention to work, and that is the creation of its own words database. Whilst all other systems that use text analysis extract the relevant words by identifying them in specific dictionaries, this system creates its own database using words that other dictionaries do not recognize.

Again, since dictionaries for relaxed-spelling languages do not contain all the variations of spelling for each word, the system needs to create and maintain its own dictionary (or lexicon) of these words—the System Transliterate Lexicon (STL). This is done without the use of specific dictionaries that will provide a single sample of the trans-literal term either.

The system is comprised of two processes, one of which is the preparation process and the other one is the search process.

In the preparation process the system goes through all of the documents in its search domain database, extracts the words that are unrecognized by regular dictionaries and spellers and through statistical analysis, decides whether that word is a transliterated term or just a typo. Actually each new document which is added to the search domain is processed when it is saved in the system. The system continuously fixes its own System Transliterate Lexicon (STL), expands it, and connects each term to the various other allowable and close spellings of the same term. Only one variation of the word is kept by the STL. Keeping this STL, allow the system to use autocomplete method to present a term that the user desires to search, and the user is not required to remember the spelling variations of this term. Thus, when the user types 'צר' the system will present him medical terms that start with צר like: צרבריטיס, צרבלום, צרביקלי etc., note that only one term represent צרביקלי while, as we have shown above, there many spelling variations of this term. The search process will find all the spelling variations of the term, even though only one is defined in the lexicon, since the connections to the same transliterated term, albeit written in another document but spelled differently, is found via the similarity of the phonetic representation.

In the search process the user enters a query. Each word in the query goes through phonetic conversion, and similar words in the corpus are searched for. The use of a search term which is already in the STL eases the search process. Therefore the system enables the user, via autocomplete procedure, to select a search term from the STL.

DETAILED DESCRIPTION

The invention will be described more fully hereinafter, with reference to the accompanying drawings, in which a preferred embodiment of the invention is shown. The invention may, however, be embodied in many different forms and should not be construed as limited to the embodiment set forth herein; rather this embodiment is provided so that the disclosure will be thorough and complete, and will fully convey the scope of the invention to those skilled in the art.

In the following description Hebrew is used as a source language and English is the origin language. This is done for the purpose of the explanation and it does not limit the scope of the invention.

Figure 1:
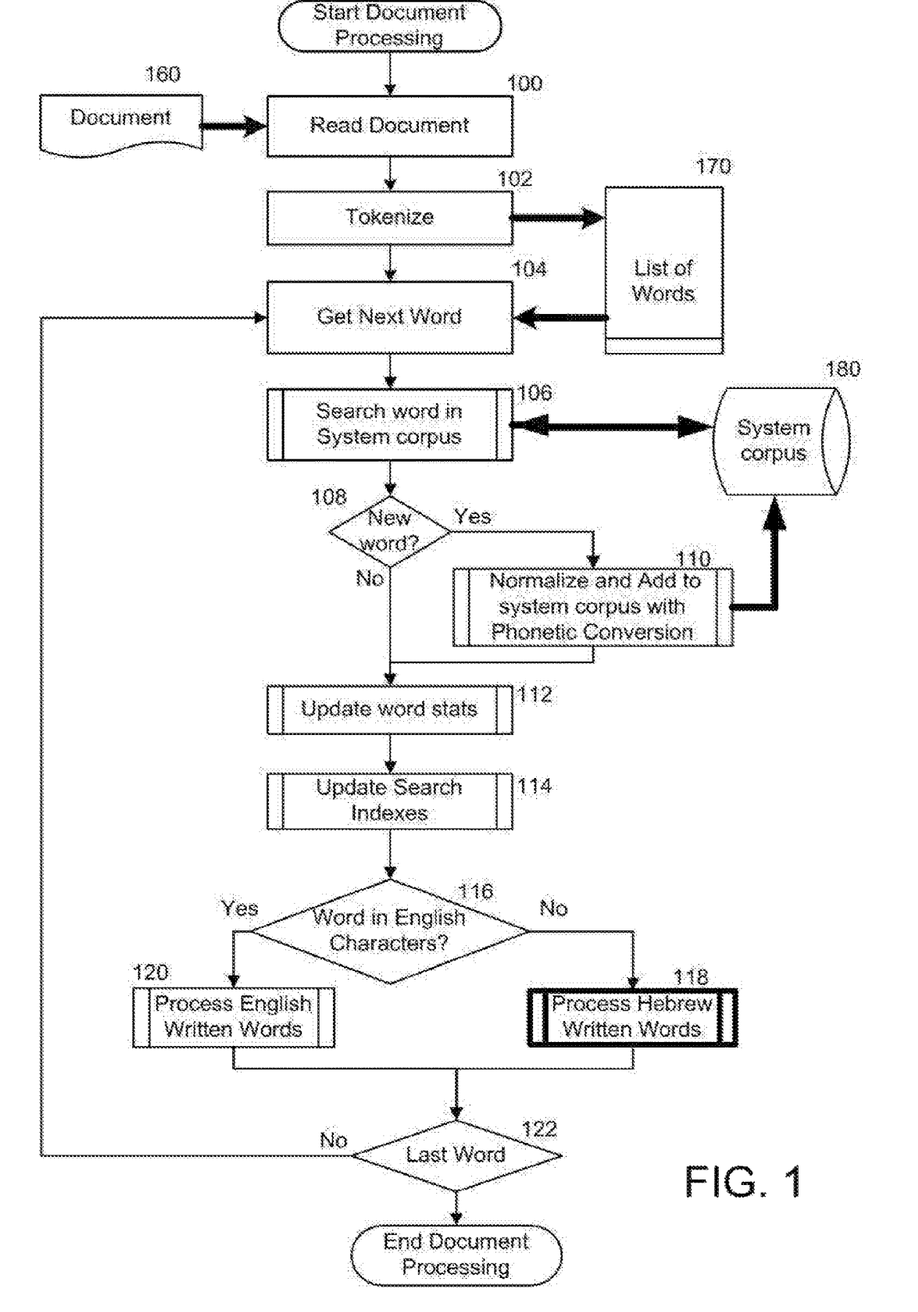
FIG. 1 is a top level flow chart of the search preparation process.

The top level flow chart of the preparation process is shown in FIG. 1. Each new medical document which is part of the search domain, written in the source language 160 goes through the preparation process. After reading the new document in step 100, it undergoes tokenization—step 102. Essentially, the words in the document are separated and put into a single list 170. Each word in the list is further processed on its own, as described below.

Before describing the processing that each word goes through, it is important to explain the corpus of the system. The corpus of the system is a database that stores information on each document and each word ever entered the system, documents that constitute the search domain. Among the information on each word the system corpus keeps a list of all documents and locations within the document where that word is located, referred to as the search indexes. It also contains a phonetic representation for each word as well as statistical information on the word.

In step 104 the next word to be processed is fetched from the list 170. In step 106 the corpus is searched to find out if the word is already known. If the word is new, as checked in step 108, than the new word with its phonetic representation are added in step 110 to the corpus—180. The statistical data and the search indexes for each word are added to the corpus 180, in steps 112 and 114 respectively. Following this the script of the word is being checked—step 116. A different process is used to process a word written in the source language (Hebrew) and to a word written in the origin language (English). The process that handles English words 120 is beyond the scope of this invention and is not a part of it. The process 118 that handles words written in Hebrew script is further described in FIG. 2.

Figure 2:
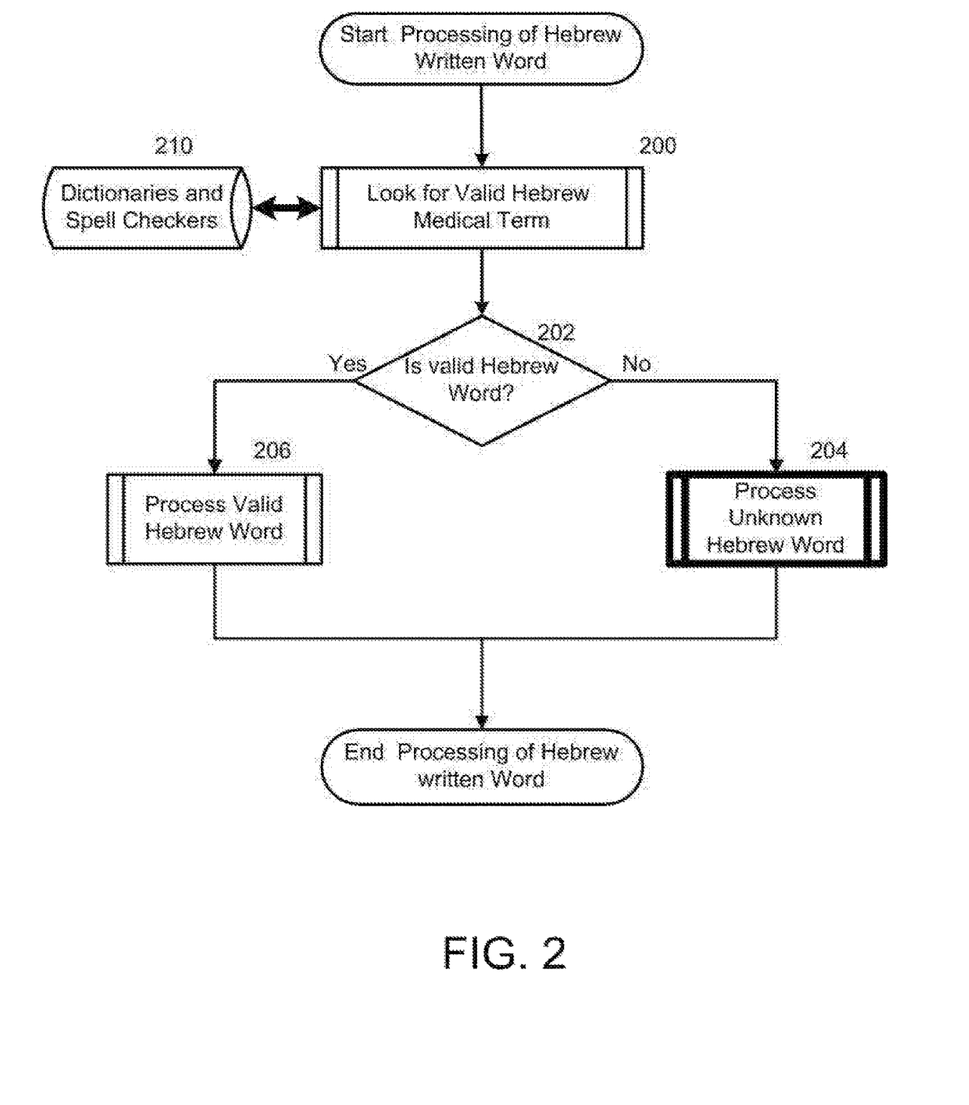
FIG. 2 presents a flow chart of the processing of a Hebrew spelled word within the preparation process.
Figure 3:
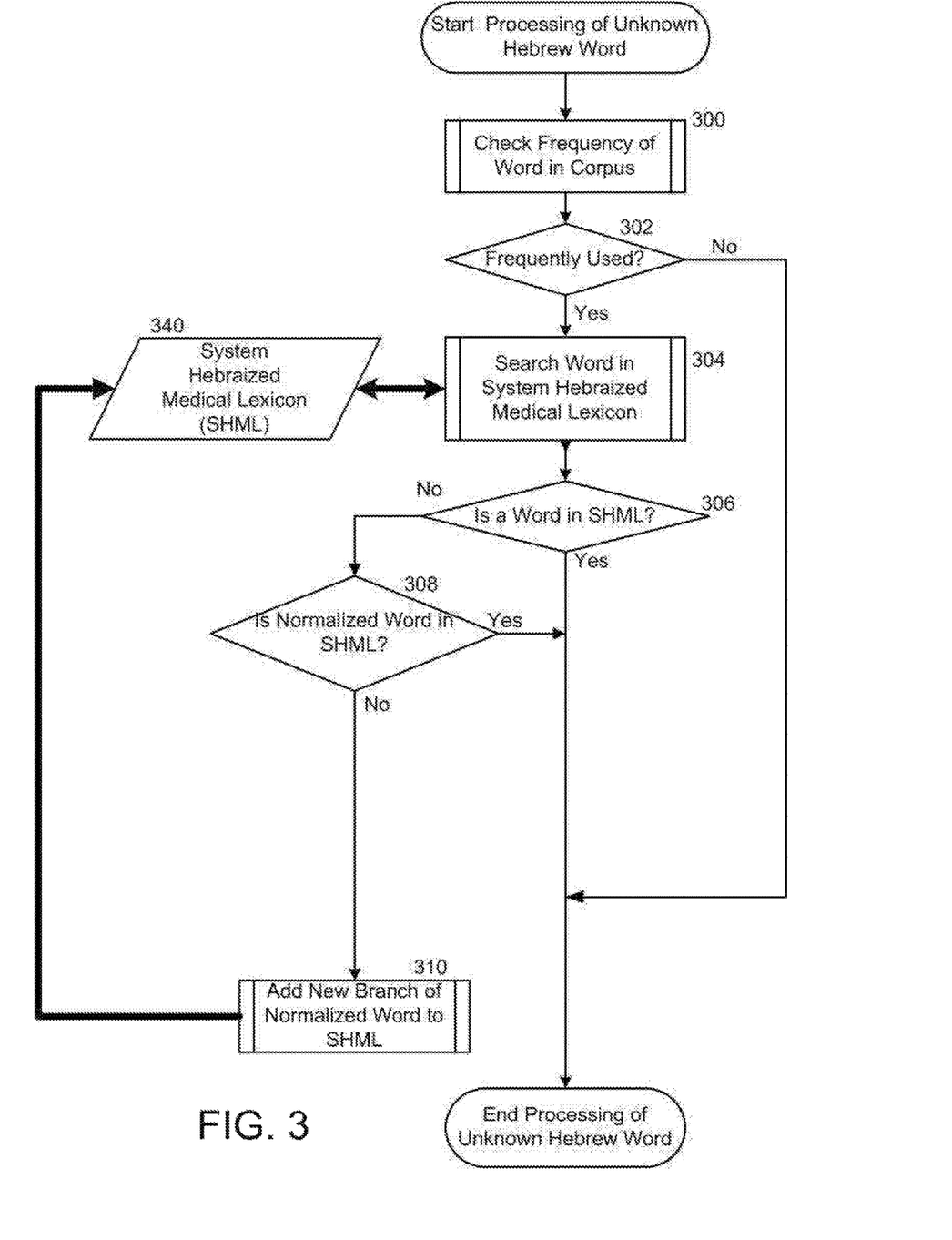
FIG. 3 shows a flow chart of the processing of Hebraized medical term within the preparation process.

FIG. 2 describes the process that each word, written in Hebrew script, undergoes. In step 200 the word is run through dictionaries and a spell checker 210, to find out whether or not it is a valid Hebrew word. If the word is a valid Hebrew word, as tested in step 202, then it is further processed in step 206 as a valid Hebrew word. This process is outside the scope of the present invention. It is worthwhile noting that Hebrew spelling rules are somewhat relaxed; every word can have several different and valid spellings (changes in specific letters). This is true for all Hebrew words, and especially to Hebraized words (English words written in Hebrew script). If the word is found to be a non-valid Hebrew word it is processed in step 204 as an unknown Hebrew word. This process is further detailed in FIG. 3.

For the benefit of the explanation, in the described example, the System Transliterated Lexicon (STL) is called System Hebraized Medical Lexicon (SHML).

An unknown Hebrew word may result either from a misspelled valid Hebrew word or from Hebraized medical term. It is assumed that misspelled Hebrew words do not occur often in the scanned documents, whereas the Hebraized medical terms frequently appear in the documents. Thus statistical analysis is used to determine word type, i.e. a typo or Hebraized term. In step 300 of FIG. 3 the frequency of the incoming unknown word in the Corpus is tested. If the incoming unknown word is not a typo, i.e. its frequency is above a predefined threshold as tested in step 302 it goes through step 304 where the SHML is searched to find whether or not the incoming unknown word or its normalized form is already in the SHML. If the incoming unknown word is in the SHML then the processing terminates. If the incoming unknown word is not in the SHML, as tested in step 306, then step 308 is executed, where the normalized form of the incoming unknown word is checked. If the normalized form of the incoming unknown word is in the SHML then the processing terminates. However, if the normalized form of the incoming unknown word is not found in the in the SHML, then step 310 is executed, where a new branch of the normalized input word is added to the SHML.

Figure 3A:
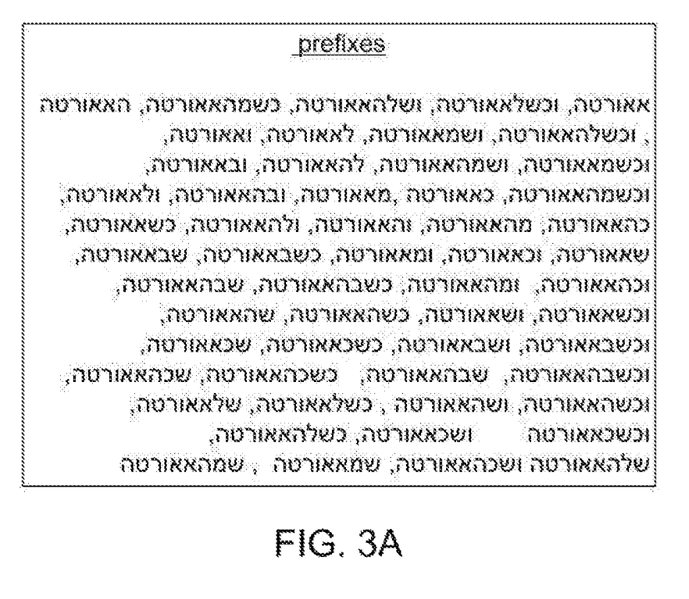
FIGS. 3A and 3B presents examples of Hebraized medical terms which include prefixes and suffixes respectively.
Figure 3B:
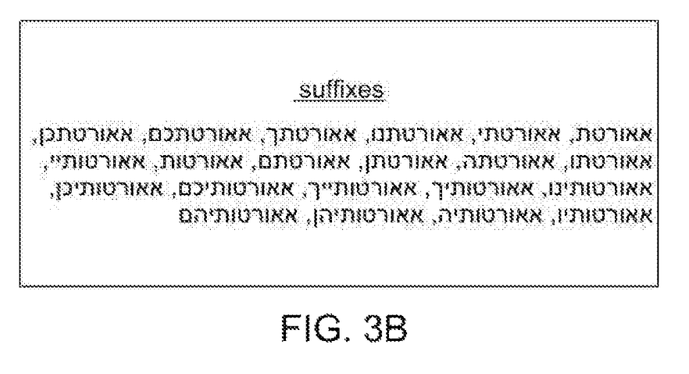

FIG. 3A and FIG. 3B present examples of combination of prefixes and suffixes that can accompany a basic medical term "אאורטה". These prefixes and suffixes are removed in step 110 of FIG. 1.

Figure 4:
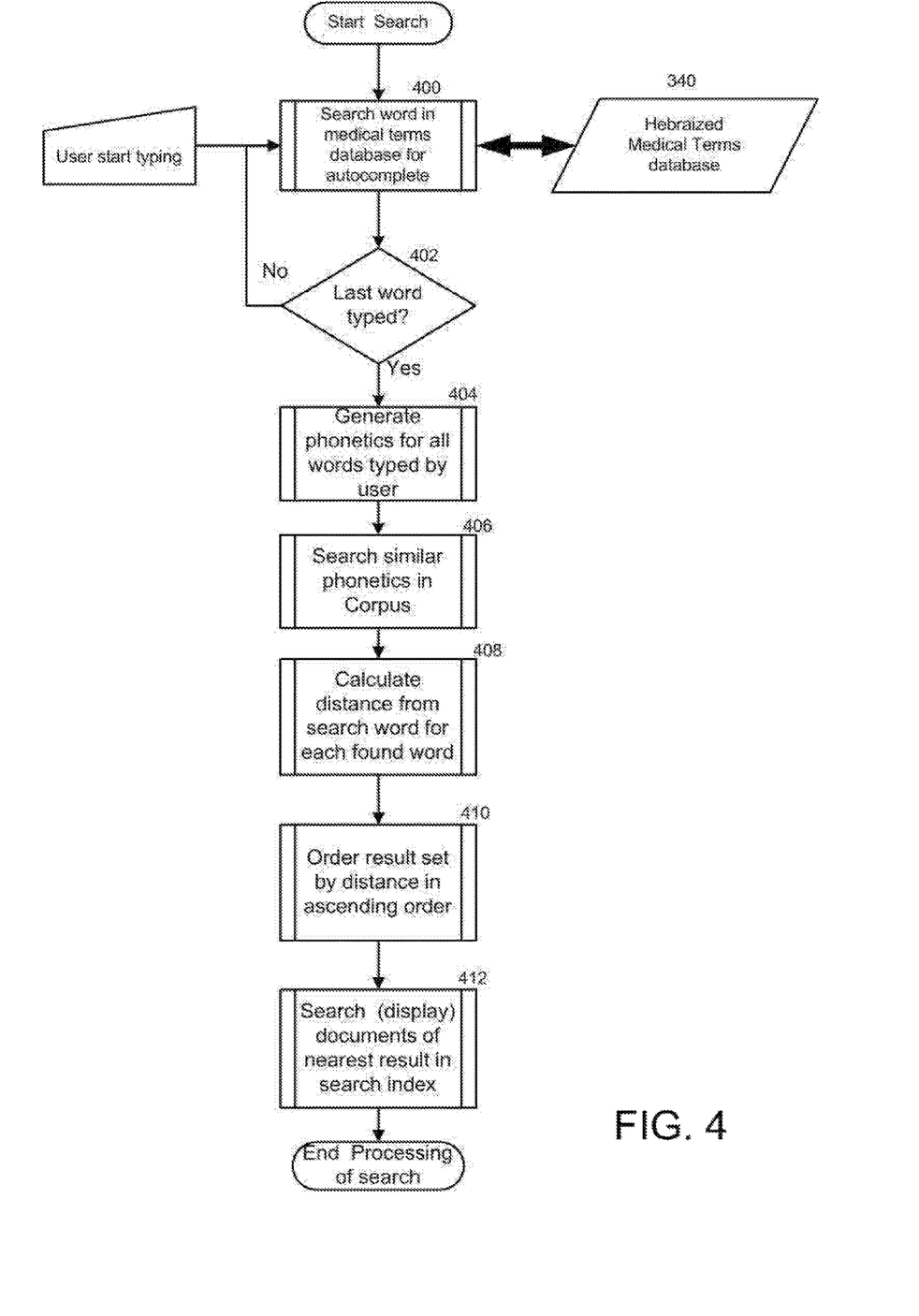
FIG. 4 shows a flowchart of the search process.

The search process is described in FIG. 4. The user types a search query which contains Hebraized medical terms. For each such term the system produces a list of Hebraized terms which have the same meaning as the one in the query, but are differently spelled. The corpus is searched for all the terms in the said list.

The search text entered by the user goes through autocomplete process, as shown in step 400 of FIG. 4. The autocomplete options are extracted from the System Hebraized Medical Lexicon (SHML). Upon the completion of the query, as detected in step 402, phonetic conversion is done for each of the words in the query—step 404. The system than searches the Corpus for similar phonetics step— 406 and calculates the distance, in step 408, between the phonetics of the typed search word and the phonetics found in the Corpus. The result set of words are ordered according to the distance from the search word in ascending order.

Figure 4A:
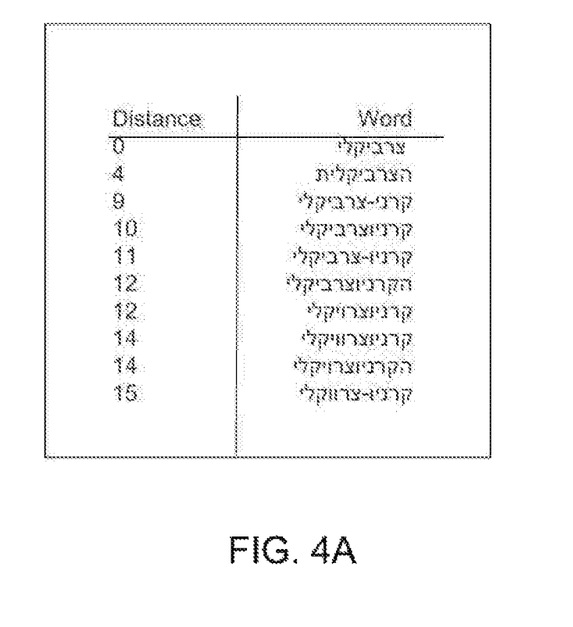
FIG. 4A is an example of different spelled words which have the same meaning.

This method allows the system to generate accurate search results, taking into account the fact that Hebraized words can be spelled differently, but still have the same meaning. An example of an ordered list for a search word "צרביקלי" is shown in FIG. 4A.

During search, a phonetic conversion and normalization is done for the search word, and the distance to similar phonetics words in the corpus is calculated. The found words in the corpus are arranged in ascending order, and the relevant documents are displayed.

What is claimed is:

1. Computer implemented method for searching words in documents written in a source language, words which are not meaningful in said source language, but are transcript of meaningful words in an origin language, the method is comprised of two processes:

a) preparation process executed for each new document, the preparation process is comprised of the following steps:
  i) reading the document;
  ii) extracting unrecognized words in the source language;
  iii) updating search indexes in the corpus for all document words;
  iv) for each new unrecognized word in the source language:
   1) removing prefixes and suffixes;
   2) performing phonetic conversion;
   3) checking frequency of unrecognized word spelling in System Hebraized Medical Lexicon (SHML);
   4) defining the most frequent spelling of the unrecognized word as the central term and connect it to other allowable and close spellings of that term;
   5) updating System Hebraized Medical Lexicon (SHML);

b) search process which is comprised of the following steps:
  i) reading the search request and perform auto-complete for terms from the System Hebraized Medical Lexicon (SHML);
  ii) generating phonetic conversion for all words in query;
  iii) for each word:
  1) searching for similar phonetics in the corpus and find central terms;
  2) calculating the distance to the found similar words and order them in ascending order; and
  3) displaying relevant documents according to the distance.

2. The method according to claim 1, where the source language is Hebrew, the origin language is either English or Latin.

3. The method according to claim 1, where the unknown words in the source language are medical terms in the origin language.

4. The method according to claim 1, where the words in the input query goes through an autocomplete procedure from the System Hebraized Medical Lexicon (SHML).

\* \* \* \* \*